United States Patent
Abrell

(10) Patent No.: US 11,213,169 B2
(45) Date of Patent: Jan. 4, 2022

(54) PORTABLE DEVICE FOR QUICK CHILLING AND HEATING

(71) Applicant: DrinkNow Corporation, Valparaiso, IN (US)

(72) Inventor: Dan Abrell, Valparaiso, IN (US)

(73) Assignee: DRINKNOW CORPORATION, Valparaiso, IN (US)

( * ) Notice: Subject to any disclaimer, the term of this patent is extended or adjusted under 35 U.S.C. 154(b) by 0 days.

(21) Appl. No.: 16/802,115

(22) Filed: Feb. 26, 2020

(65) Prior Publication Data

US 2020/0275805 A1 Sep. 3, 2020

Related U.S. Application Data

(60) Provisional application No. 62/812,404, filed on Mar. 1, 2019.

(51) Int. Cl.
*A47J 41/00* (2006.01)
*F25D 3/08* (2006.01)

(52) U.S. Cl.
CPC ............. *A47J 41/0044* (2013.01); *F25D 3/08* (2013.01); *F25D 2303/081* (2013.01); *F25D 2331/811* (2013.01)

(58) Field of Classification Search
CPC ................ F25D 3/08; F25D 2331/811; F25D 2303/081; F25D 23/02; A47J 41/0044; A47J 31/50; A47J 36/24
See application file for complete search history.

(56) References Cited

U.S. PATENT DOCUMENTS

| 58,033 A | * | 9/1866 | Wright ............... F28D 21/0012 165/47 |
| 2,716,871 A | | 9/1955 | Brown |
| 4,015,945 A | | 4/1977 | Frankel et al. |
| 4,191,302 A | | 3/1980 | Fiducia |
| 4,204,613 A | | 5/1980 | Terzian et al. |

(Continued)

FOREIGN PATENT DOCUMENTS

WO WO2018/066998 A 4/2018

OTHER PUBLICATIONS

PCT International Search Report, dated Jun. 4, 2020, corresponding to International Application No. PCT/US20/19955.

(Continued)

*Primary Examiner* — Joseph F Trpisovsky
(74) *Attorney, Agent, or Firm* — Husch Blackwell LLP

(57) ABSTRACT

A device for chilling and heating of fluids, particularly beverages and liquid foods, is provided. The heating or cooling device can include a container encasing an insulation system, a cover or lid for covering the container, and the insulation system. The insulation system can include a coil made of a temperature-conductive material and fashioned to connect to an inlet in the cover and to an outlet in the container. The cover can also include a fluid reservoir for accepting the liquid to be processed, and an open section providing a passageway for adding additional insulating material to the insulating system while the device is in use. Once the device is assembled, a liquid can be poured into the fluid reservoir, pass through the coil that carries the liquid through the insulating system, and exit the container as a chilled or heated liquid.

18 Claims, 6 Drawing Sheets

(56) References Cited

U.S. PATENT DOCUMENTS

| | | |
|---|---|---|
| 4,407,356 A | 10/1983 | DeLau |
| 4,494,600 A | 1/1985 | DeLau |
| D279,250 S | 6/1985 | Holloway |
| 4,599,872 A | 7/1986 | Rist |
| D293,291 S | 12/1987 | Hansen |
| 4,796,696 A | 1/1989 | Stocton et al. |
| 5,031,831 A | 7/1991 | Williams, III |
| 5,211,298 A | 5/1993 | Bloch |
| 5,358,241 A | 10/1994 | Anghelo |
| 5,415,002 A | 5/1995 | Koenig |
| 5,503,296 A | 4/1996 | DiBaggio |
| 5,762,120 A | 6/1998 | Smith |
| 6,547,103 B1 | 4/2003 | Elliott |
| D496,827 S | 10/2004 | Bodum |
| D497,080 S | 10/2004 | Greenspon |
| D530,852 S | 10/2006 | Zheng |
| 7,117,685 B2 | 10/2006 | Wetherbee |
| D540,979 S | 4/2007 | Chen |
| D542,077 S | 5/2007 | Claypool et al. |
| D550,035 S | 9/2007 | Tien |
| D557,985 S | 12/2007 | Arcangeli |
| D613,134 S | 4/2010 | McRorie, III et al. |
| D646,524 S | 10/2011 | Kortleven |
| 8,066,152 B2 | 11/2011 | Tetreault et al. |
| D655,967 S | 3/2012 | Bodum |
| D673,426 S | 1/2013 | Heiberg et al. |
| 8,429,925 B2 | 4/2013 | Marx |
| D681,396 S | 5/2013 | Krus |
| 8,640,748 B2 | 2/2014 | Chera |
| D702,475 S | 4/2014 | Dalton et al. |
| D712,702 S | 9/2014 | Stamper et al. |
| D737,619 S | 9/2015 | Cornu et al. |
| D753,951 S | 4/2016 | Cornu et al. |
| 9,357,874 B2 | 6/2016 | Licare |
| D760,544 S | 7/2016 | Anzalone et al. |
| D812,984 S | 3/2018 | Seiders et al. |
| D824,213 S | 7/2018 | Abrell |
| 2006/0260326 A1* | 11/2006 | Hickey .............. A47J 36/28 62/4 |
| 2007/0084233 A1 | 4/2007 | Kett et al. |
| 2010/0084370 A1 | 4/2010 | Ranzoni et al. |
| 2012/0002501 A1 | 1/2012 | Ulstad et al. |
| 2018/0216875 A1* | 8/2018 | Caswell ............ F25D 31/002 |

OTHER PUBLICATIONS

PCT Written Opinion of the International Searching Authority, dated Jun. 4, 2020, corresponding to International Application No. PCT/US20/19955.

\* cited by examiner

PORTABLE DEVICE FOR QUICK CHILLING AND HEATING

CROSS-REFERENCE TO RELATED APPLICATION

This application claims the benefit of the filing date of U.S. Provisional Application Ser. No. 62/812,404 filed Mar. 1, 2019, entitled, "Portable Device For Quick Chilling And Heating" which is hereby incorporated by reference as if fully set forth herein.

BACKGROUND OF THE INVENTION

Many consumers of beverages and liquid foods prefer their consumable liquids served at heated or chilled temperatures. Often, when an individual desires to consume such liquids, those liquids possess a temperature that is too hot or too cold for palatability or for safe consumption.

Many freshly-prepared beverages can possess a temperature too hot for comfortable or safe consumption, such as a freshly-brewed pot of coffee. Here, an individual may prefer the liquid to be cooled before consuming it. Other beverages, such as wine or beer or sake, are considered to have an improved or optimal taste when served at a certain temperature or temperature range, usually a temperature either much cooler or much warmer than a typical ambient or room temperature. Also, many beverages and liquid foods are stored under refrigerated conditions, and an individual may prefer the liquid to be adjusted to a warmer temperature before consuming it.

The optimal drinking experience can require the adjustment of the fluid's temperature before consumption. There is a need for a container that can quickly alter the temperature of consumable liquids without diluting or contaminating the liquid.

There is also a need for such a device that is configured to allow the replenishment of the insulating material without disrupting the heating or cooling process being applied to the liquid.

There is also a need for such a device sized large enough to process one or several servings of liquid, but also small enough to be portable and easily manipulated and transported.

BRIEF SUMMARY OF THE INVENTION

The present invention relates to the field of appliances for chilling and heating of fluids. It is particularly, but not exclusively, suited for lowering the temperature of liquids such as beer, wine, liquor, spirit, coffee, soft drinks, and tea, or raising the temperature of liquids such as water, broth, sake, tea, and therapeutic liquids. Both cooling and heating can be accomplished without diluting the fluid whose temperature is altered by the device.

The invention relates to a device that is portable. It relates to a device that can be readily disassembled, for cleaning, storage, and ease of transport, and readily assembled or reassembled as desired.

The invention also relates to a device that is configured to allow the replenishment of the material used to alter the temperature of the fluid, without having to interrupt the chilling or heating activity of the device.

The invention also relates to a device that can be used for both heating and chilling liquids.

BRIEF DESCRIPTION OF THE DRAWINGS

The accompanying drawings illustrate the present invention and together with the description, further serve to explain the principles of the invention and to enable a person skilled in the relevant art to make and use the invention.

These and other features and advantages of the present invention will be apparent from the following detailed description, claims, and accompanying drawings.

FIG. 10A is a side view of the portable device. FIG. 10B is a cross-sectional view of the device.

Figure 1:
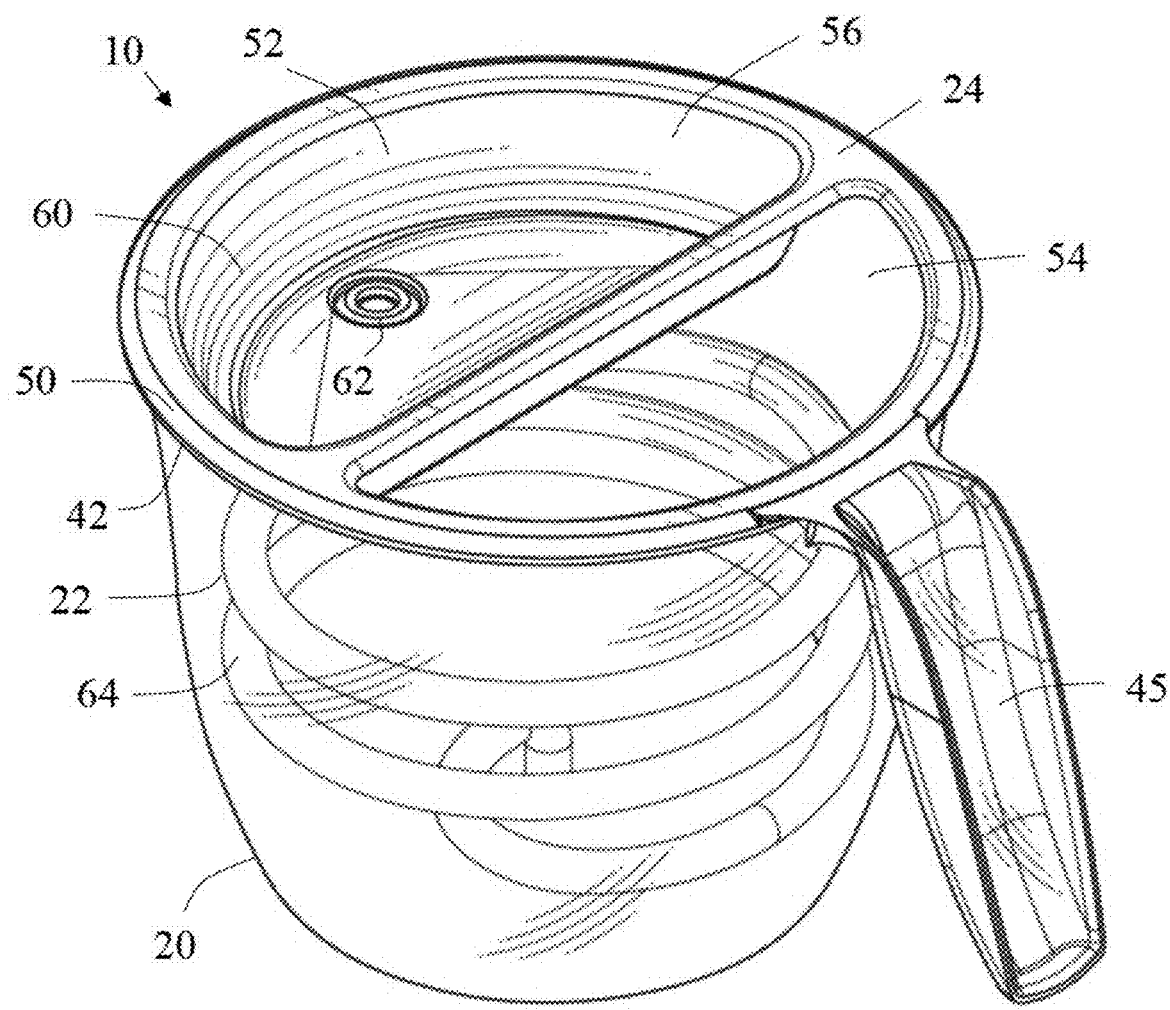
FIG. 1 is a perspective view of an embodiment of a portable device for quickly chilling or heating a liquid.
Figure 2:
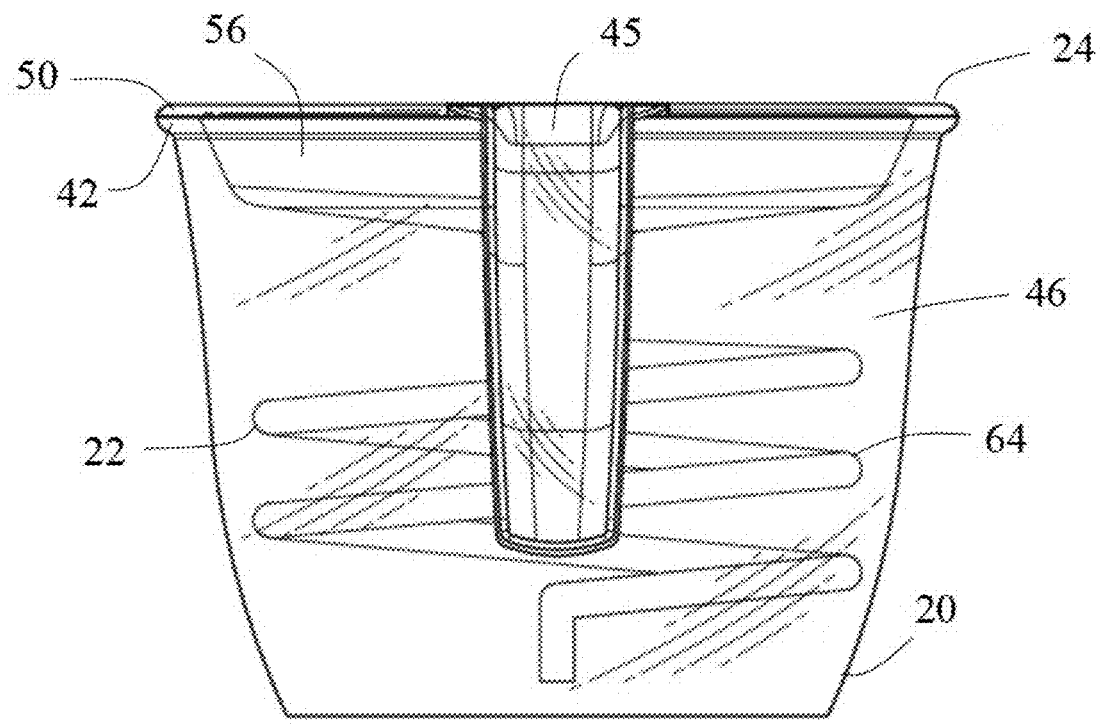
FIG. 2 is a rear side view of the portable device for quickly chilling or heating a liquid.
Figure 3:
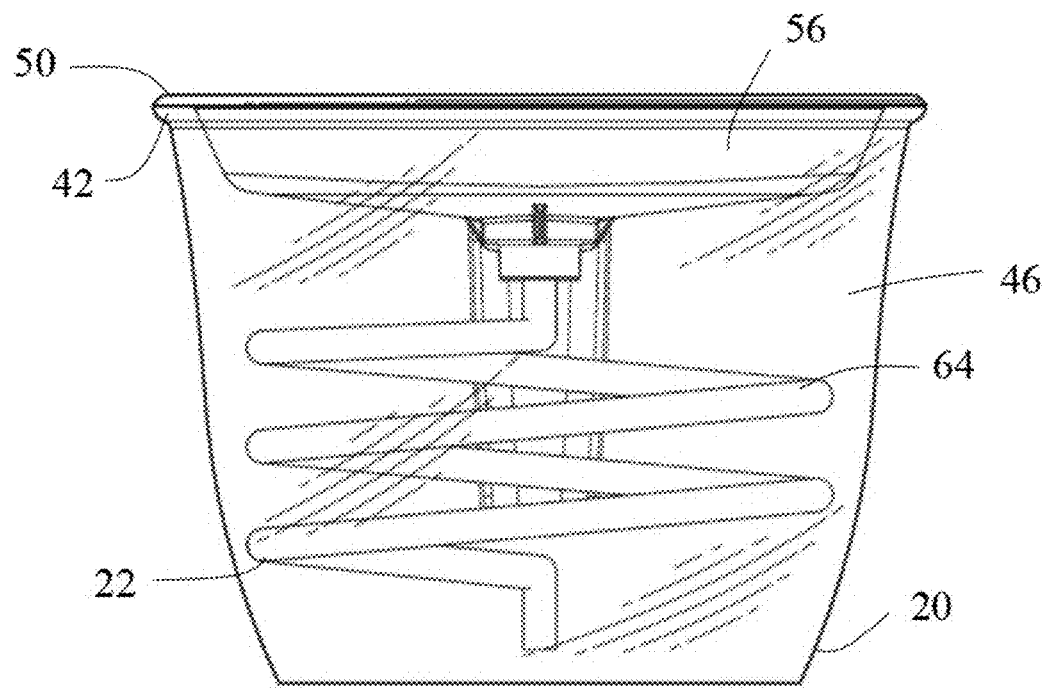
FIG. 3 is a front side view of the portable device for quickly chilling or heating a liquid.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE INVENTION

While this invention is susceptible of embodiments in many different forms, there are shown in the drawings and will be described in detail herein specific embodiments with the understanding that the present disclosure is to be considered as an exemplification of the principles of the invention. It is not intended to limit the invention to the specific illustrated embodiment.

The features of the invention disclosed herein in the description, drawings, and claims can be significant, both individually and in any desired combinations, for the operation of the invention in its various embodiments. Features from one embodiment can be used in other embodiments of the invention.

Referring to the Figures, FIGS. 1-10 show embodiments of an appliance or device 10 for use in altering the temperature of a beverage or liquid food, as shown in accordance with the present invention. General statements made about embodiments used as a cooling device are generally transferable to similar embodiments employed as a heating device.

Referring first to FIGS. 1-7, a heating or cooling device 10 can include a container 20 for containing or encasing an insulation system 22, a lid or cover 24 for covering the container 20, and the insulation system 22 for cooling a potable liquid. On one end, the insulation system 22 can connect to an inlet 26 located in the cover 24, and the other end of the insulation system 22 can connect to an outlet 28 located in the container 20. The cover 24 can also include an open section 54 providing a passageway for an individual to add an insulating material to the insulating system 22 while the device 10 is in use. The device 10 can optionally include plugs for sealing each end of the insulation system 22.

Figure 9:
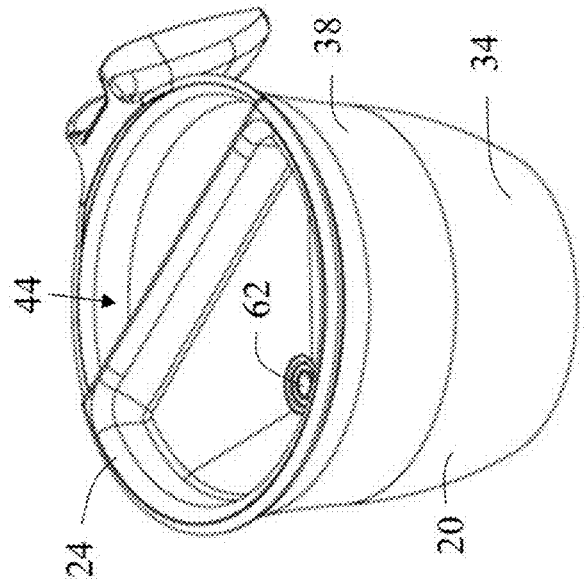
FIG. 9 is a perspective view of an embodiment of the portable device.
Figure 10B:
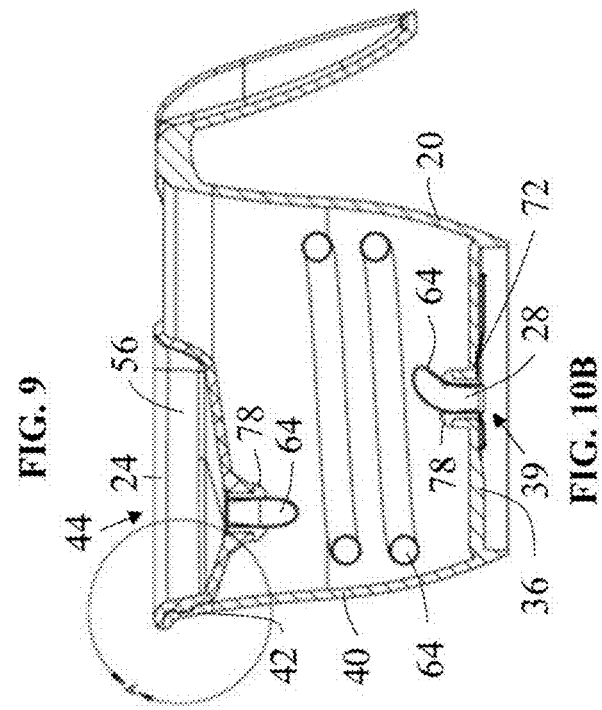
FIGS. 10A-10B are views of the portable device shown in FIG. 9.
Figure 10C:
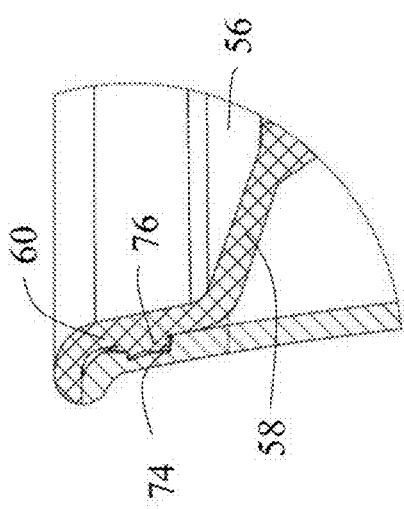
FIG. 10C is an enlarged section of FIG. 10B, showing a mating engagement of the container and the closure.
Figure 10A:
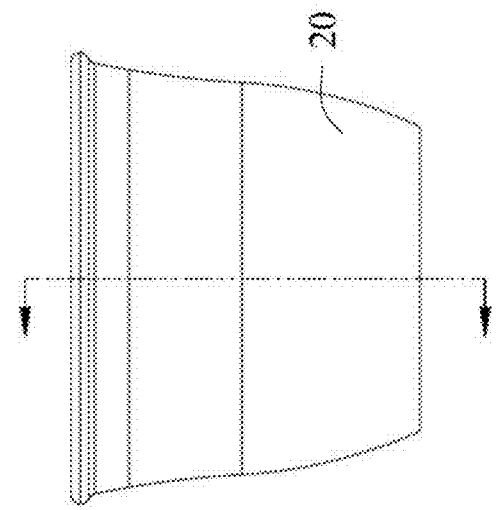

The device 10 can include a container 20, which can be generally cylindrical as shown in FIGS. 9-10, and the container 20 can have the general shape of a cup or pitcher for example. The container 20 can include a lower section 34, which can include a fluid-tight floor 36 as the bottom surface of the container 20. The container 20 can include an upper section 38 opposed to the lower section 34. A sidewall 40 can extend upward from the floor 36 and can terminate in a lip 42 defining an opening or mouth 44 of the container 20. The sidewall 40 can connect the floor 36 and lip 42 of the container 20.

The mouth 44 can provide for an upper section 38 that is not fluid-tight.

While the floor 36 can be generally fluid-tight, it can include an outlet 28 for providing an egress for potable liquids being cooled in the device 10. Preferably, the outlet 28 is located in a central portion 39 of the floor 36.

The container 20 can include a handle member 45, preferably attached to an exterior surface of the sidewall 40. The handle member 45 provides a means for grasping and manipulating the device 10.

The device 10 can include a lid or cover 24 for covering the mouth 44 of the container 20. The cover 24 can act as a closure for the container 20. When the cover 24 is engaged to the container 20, the two structures together can define an enclosure having an inner chamber 46 for holding the insulation system 22 and for accepting the addition of an insulating material.

The cover 24 can include a peripheral rim 50 that defines an outer or peripheral edge of the cover 24. That peripheral rim 50 can communicate with the lip 42 of the container 20, and the cover 24 can be positioned to lie atop the mouth 44 of the container 20.

Figure 6:
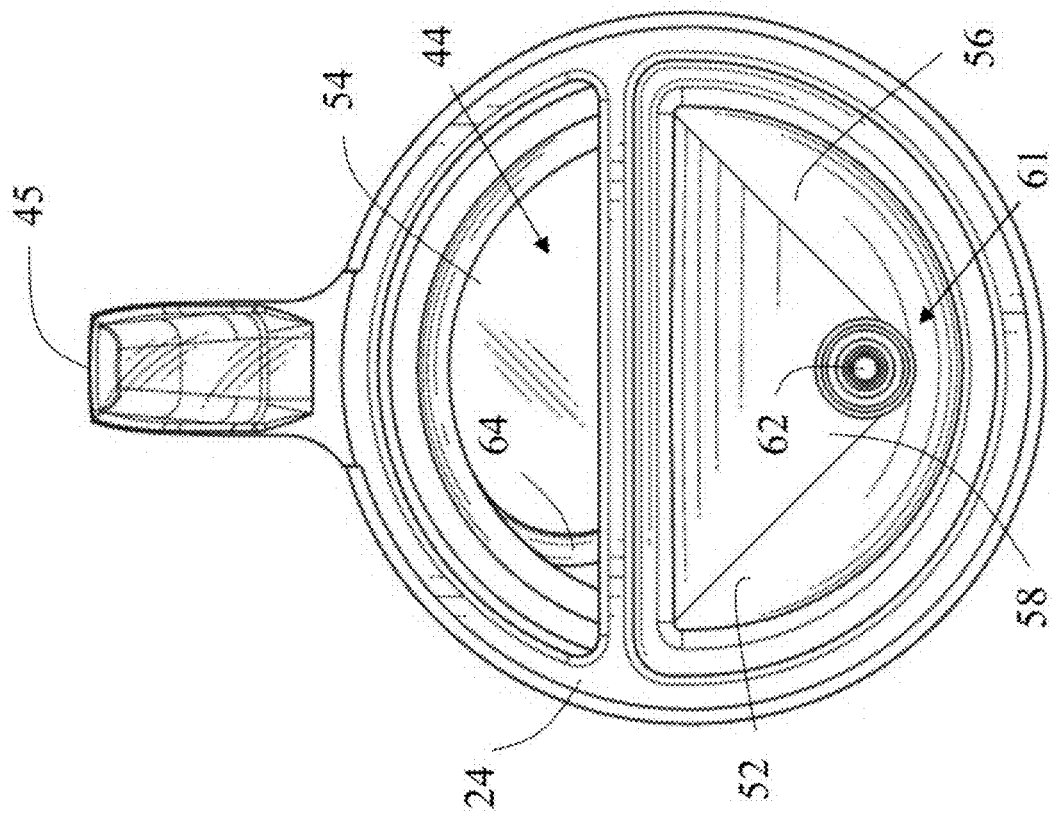
FIG. 6 is a top view of the portable device for quickly chilling or heating a liquid.

The cover 24 can include a solid section 52 located proximate or adjacent to an open section 54. As shown in FIG. 6 for example, the open section 54 can define an opening or aperture in the cover 24. It is preferred that the open section 54 be large enough to accommodate the transfer of an insulating material through the opening or aperture provided by the open section 54. The solid section 52 can provide cover or enclose a portion of the inner chamber 46, while another portion of the inner chamber 46 can communicate with its external environment through the open section 54.

As shown in FIGS. 1 and 6, for example, the peripheral rim 50 of the cover 24 can communicate with the entire lip 42 of the container 20. As shown in FIGS. 9-10, some embodiments can include a cover 24 that communicates with a portion of the lip 42. It is preferred that a first portion of the mouth 44 be obscured by the cover 24 and that a second portion of the mouth 44 be left uncovered and unobstructed. The unobstructed portion of the mouth 44 can provide an opening through which an insulating material can be transferred into and out of the insulating system 22, particularly while the device 10 is in use.

The solid section 52 can include a liquid or fluid reservoir 56, a receptacle for initially receiving an amount of potable liquid into the device 10. The fluid reservoir 56 can be bounded by a bottom surface 58, and have a peripheral wall 60 extending upward (or away) from the bottom surface 58. That peripheral wall 60 can extend to the peripheral rim 50 of the cover 24; alternatively, the peripheral wall 60 can extend to the top surface of the device 10. A first portion of the peripheral wall 60 can be disposed, so that when the container 20 and cover 24 are engaged, a portion of the peripheral wall is proximate to the sidewall 40. Preferably, that first portion of the peripheral wall 60 can be disposed proximate or adjacent to an upper section 38 of the sidewall 40. A second portion of the peripheral wall 60, contiguous with the first portion, can be proximate or adjacent to the open section 54 of the cover 24. In some embodiments, the second portion of the peripheral wall can be located distal from the sidewall 40; it can define an edge or border of the portion of the mouth 44 left unobstructed by the cover 24.

Figure 4:
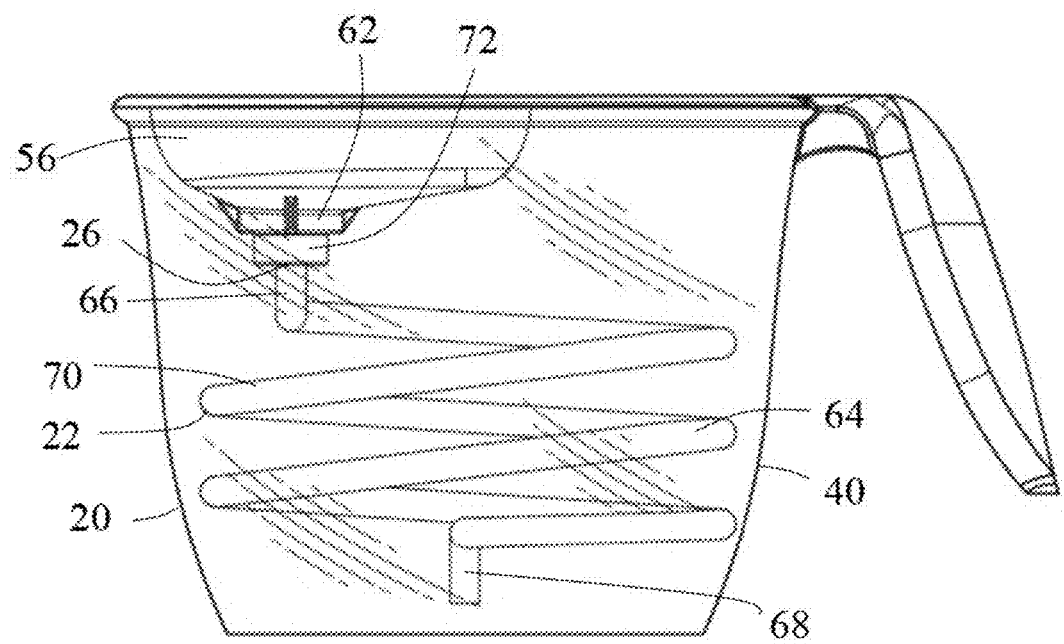
FIG. 4 is a side view of the portable device for quickly chilling or heating a liquid.
Figure 5:
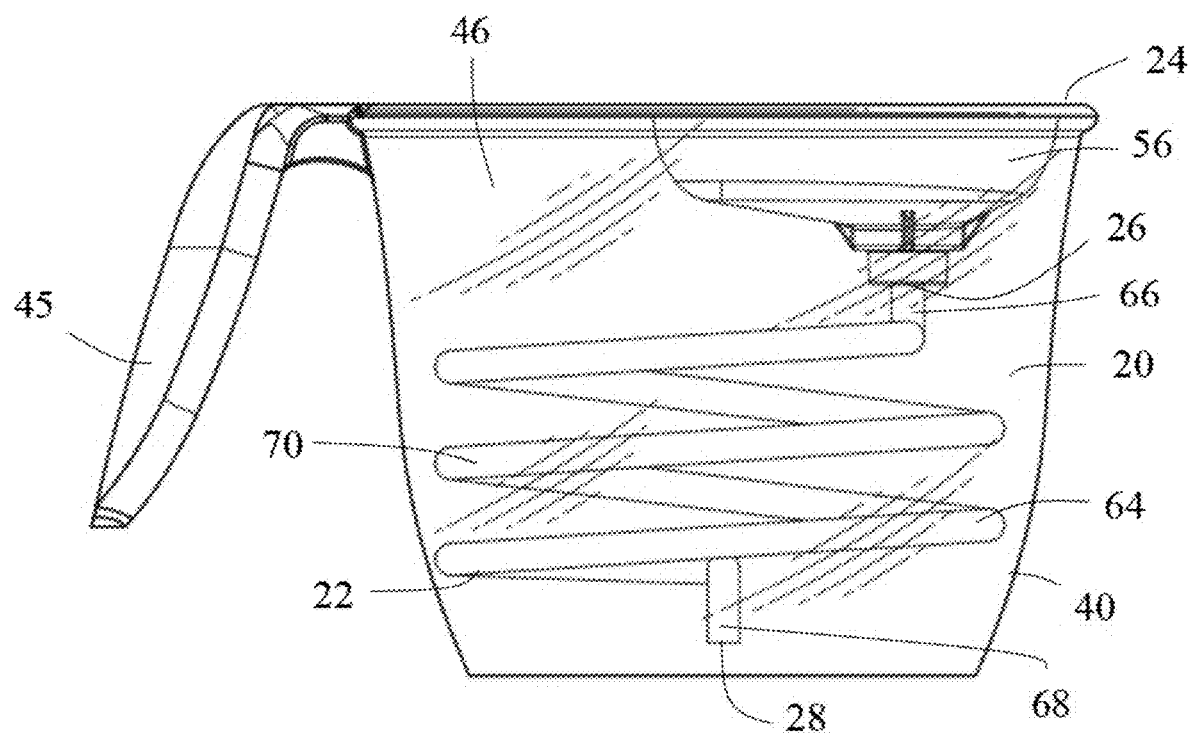
FIG. 5 is a side view of the portable device for quickly chilling or heating a liquid.
Figure 7:
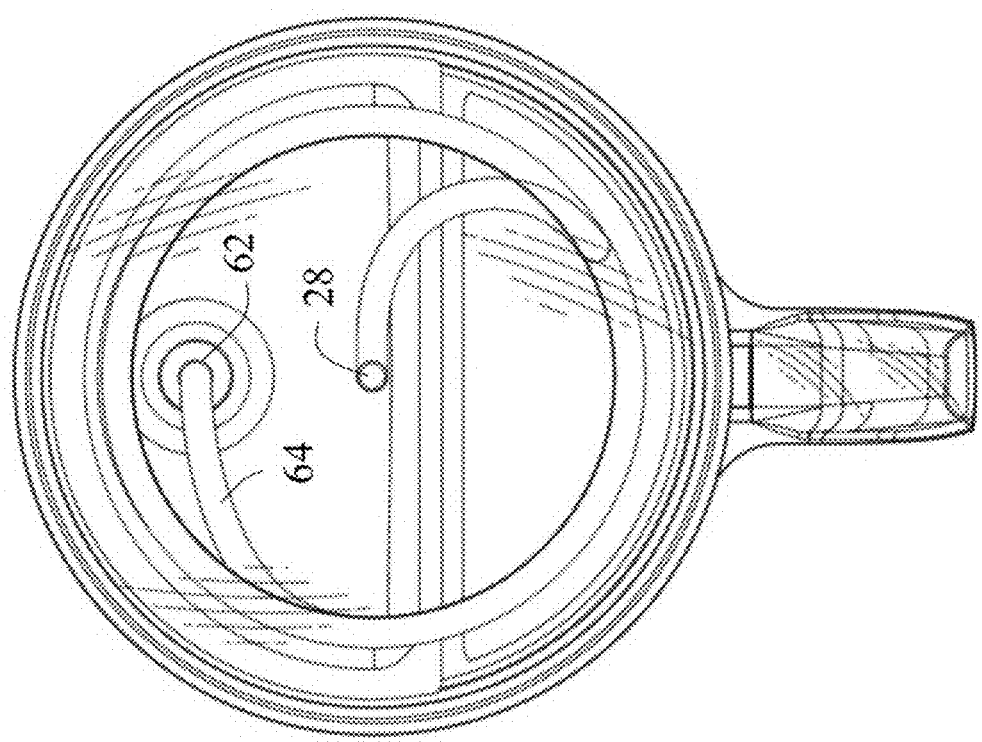
FIG. 7 is a bottom view of the portable device for quickly chilling or heating a liquid.

The fluid reservoir 56 can include an opening or aperture that acts as an intake 62. As shown in FIGS. 1 and 4-5, the intake 62 can be located in the bottom surface 58 of the cover 24, when the device 10 is in an upright configuration with the cover 24 and container 20 engaged to each other. Preferably, the fluid reservoir 56 defines a void space having a convex shape or volume, for encouraging fluid flow into the intake 62. As shown in FIG. 6, for example, preferably, the intake 62 can be located in a central portion 61 of the bottom surface 58 of the cover 24.

The inner chamber 46 of the device 10 can contain an insulation system 22 for providing a pour-through, gravity-operated heat exchange system for cooling or heating the potable liquid. The insulation system 22 can comprise a coil 64 made of a material conducive to heat- or temperature-exchange. For example, as shown in FIGS. 1 and 4-5, the insulation system 22 can comprise a generally helical coil 64 made of metal tubing made of, for example, aluminum, copper, stainless steel, or other metal or metal alloy. When disposed in the inner chamber 46, the coil 64 can be disposed to connect the intake 62 in the cover 24 to the outlet 28 in the container 20.

The coil 64 can have a hollow center or hollow inner portion, providing a tube or conduit for transporting the potable liquid between the intake opening 62 in the cover 24 and the outlet opening 28 in the container 20.

The coil 64 can have an upper end portion 66 for communicating with the intake 62. The coil 64 can have a lower end portion 68 for communicating with the outlet 28. The coil 64 can have a central portion 70 located between the upper and lower end portions 66, 68 that connects or joins them. At the upper and lower end portions 66, 68, the coil 64 can adopt a straight or linear conformation, for engaging the intake 62 and outlet 28, respectively.

As shown in FIGS. 4-5, the intake 62 can include a channel member 72 for receiving the upper end portion 66. The channel member 72 can extend away from the opening or aperture defined by the intake 62, providing a conduit or passageway through which the upper end portion 66 can be threaded. Thus, the upper end portion 66 can be guided into a position for communicating with the intake 62. It is preferred that the upper end portion 66 be configured for insertion into the channel member 72. As shown in FIGS. 4-5, the terminal end of the upper end portion 66 can include a linear or tubular segment that can be threaded into the opening or aperture defined by the intake 62.

Similarly, the outlet 28 can include a channel member 72 for receiving the lower end portion 68. The channel member 72 can extend away from the opening or aperture defined by the outlet 28, providing a conduit or passageway through which the lower end portion 68 can be threaded. Thus, the lower end portion 68 can be guided into a position for communicating with the outlet 28. It is preferred that the lower end portion 68 be configured for insertion into the channel member 72. As shown in FIGS. 4-5, the terminal end of the lower end portion 68 can include a linear or tubular segment that can be threaded into the opening or aperture defined by the outlet 28.

The intake 62 and outlet 28 can form an air-tight or liquid-tight seal or connection between: i) the intake 62 and the upper end portion 66 or ii) the outlet 28 and the lower end portion 68. The coil 64 can include a gasket 78 at either end, to facilitate a tight seal with the cover 24 and the container 20 of the device 10. Alternatively, the intake 62 and outlet 28 can each comprise a gasket or liner 78 to facilitate forming an air-tight or liquid-tight engagement with the coil 64.

The intake 62 and outlet 28 can each comprise a plug for sealing them, particularly when the coil 64 is not engaged with them. Similarly, the upper and lower end portions 66, 68 of the coil 64 can comprise a plug for sealing them, particularly when the coil 64 is not in use.

Between the upper and lower end portions 66, 68, the central portion 70 of the coil 64 can define a generally helical shape. That is, from the upper end portion 66, the central portion 70, the central portion 70 can be directed radially inward and downward toward the lower end portion 68. Alternatively, from the lower end portion 68, the central portion 70 can be directed radially inward and upward toward the upper end portion 66.

The coil 64 can be arranged so that when the container 20, cover 24, and coil 64 are engaged or connected, some or all of the segments of the central portion 70 can be disposed to be proximate to the sidewall 40. As shown in FIGS. 4-5, when the device 10 is an assembled configuration, the coil 64 can be disposed in the lower section 34 of the container 20 in a spaced relationship with the sidewall 40 of the container 20. The coil 64 can be disposed within the container 20 so that its helical axis generally aligns with a longitudinal or vertical axis of the container 20.

In the assembled configuration, the fluid reservoir 56 and the intake 62 can be disposed in the upper section 38 of the container 20.

Figure 8:
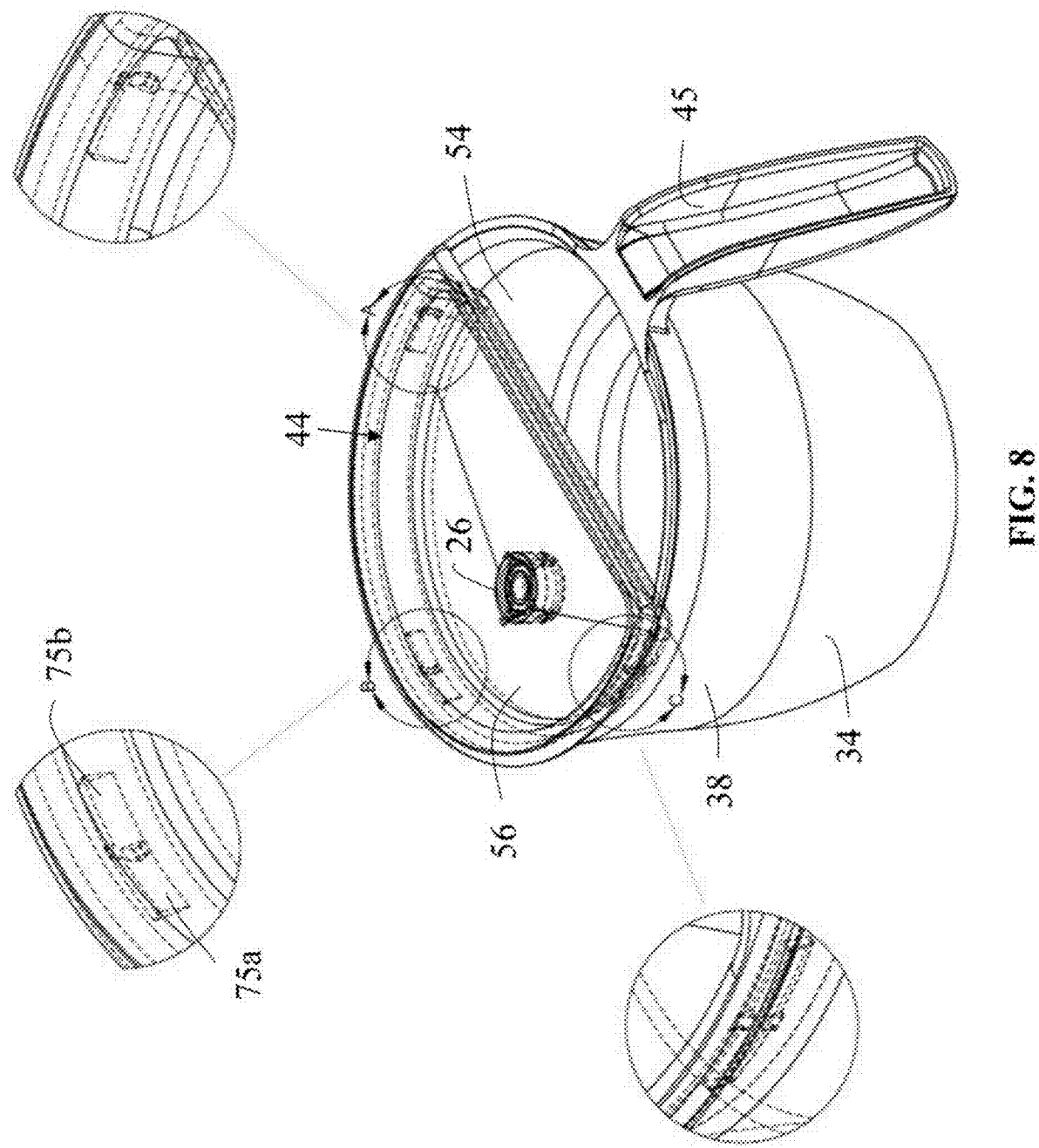
FIG. 8 is a perspective view of an embodiment of the portable device including a container covered by a closure, showing a feature for securing the closure to the container via container structures configured to engage in a mating fashion with corresponding structures on the lid.

The device 10 can include structures for joining the container 20 to the cover 24, such as shown in FIGS. 8 and 10B-C. The upper section 38 of the container 20 can include one or more recesses or depressions 74 on the inner surface of the sidewall 40. The recesses 74 can be shallow, that is, the recesses 74 can be deep enough to define a depression in the sidewall 40, but not so deep as to define an aperture or hole through the sidewall 40.

The cover 24 can include protrusions or projections 76 for engaging the recesses 74 on the container 20. The protrusions 76 can be located, for example, on the exterior surface of the peripheral wall 60 of the fluid reservoir 56. The protrusions 76 can be located on a portion of the peripheral wall 60 that is proximate or adjacent to the upper section 38 of the sidewall 40.

In some embodiments, the protrusions 76 can be located in the peripheral rim 50 of the cover 24.

The recesses 74 and the protrusions 76 can be arranged in a regularly-spaced apart fashion. To promote engagement between the two structures, the size and placement of the protrusions 76 preferably mirrors the mirroring the size and placement of the recesses 74 on the container 20. It is preferred that corresponding recesses 74 and protrusions 76 be of a size and shape to facilitate a connection between them, preferably a male-female mating connection or engagement. That is, each recess 74 can be configured to provide a receptacle 74 for receiving and engaging a corresponding protrusion 76.

For example, the recesses 74 can possess a generally rectangular shape with a bulging ridge in its central portion, while the protrusions 76 can possess a similarly-sized or slightly smaller-sized volume with a furrow in its central portion. When a corresponding recess 74 and protrusion 76 meet, they can join together like puzzle pieces.

Each of the container 20 and the cover 24 can possess an engagement member 75 for engaging with each other, preferably in a mating fashion; that is, so that the engagement member 75a on the container 20 can contact a corresponding engagement member 75b on the cover 24, such as shown in FIG. 8, in a manner to fix the position of the container 20 and the cover 24 with respect to each other. The engagement members are not limited to corresponding recesses 74 and protrusions 76, but can include any three-dimensional conformations for engaging together.

Multiple sets of corresponding recesses 74 and protrusions 76 can be arranged in the upper section 38 of the container 20 and the exterior surface of the peripheral rim 50 of the cover 24, respectively, to guide the cover 24 and container 20 into an assembled configuration. In such configuration, the open section 54 of the cover 24 can be located proximate to the handle member 45.

In some embodiments, the placement of the recesses 74 and the protrusions 76 can be reversed, with the recesses 74 located on the cover 24 and the protrusions 76 located on the container 20.

The insulating material, when cooling or chilling is desired, can comprise ice in various forms, such as ice cubes, ice chips, ice shavings, or cracked ice, cold water, and other cold solids or substances. The insulating material can comprise water or a mixture of water and ice. However, "cold" can be a relative term; it need not be below 32° F. or below 0° F. The insulating material is cold enough if it has a temperature less than that of the liquid to be chilled.

The insulating material, when heating is desired, can comprise hot or boiling water or other hot liquid or solid, or mixtures thereof. "Hot" can be a relative term; it need not be above 312° F. or above 100° F., the insulating material is hot enough if it has a temperature greater than that of the liquid to be heated.

Where it desired to maintain a liquid at a particular temperature or temperature range, then the insulating material can comprise a material possessing the desired temperature or temperature range.

In some embodiments, the same device 10 can have an insulation system 22 that can make use of insulating materials for both heating and chilling liquids, though one at a time.

To use the appliance 10 for cooling, the coil 64 can be placed into the container 20, and the lower end portion 68 of the coil 64 can be engaged to the outlet 28 of the container 20, preferably in a liquid-tight connection. A supply of ice cubes or other cold insulating material can be loaded into the center of the open container 20. The coil 64 can wind upward to a height proximate to the lip 42 of the container 20. The desired insulating material can be added to the inner chamber 46 in proximity to, or in contact with, the coil 64, thus providing an insulation system 22 for heating or cooling liquids that will be passed through the coil 64.

Approximately contemporaneously, the upper end portion 66 of the coil 64 can engage the intake 62 in the cover 24, the peripheral edge or rim 50 of the cover 24 can engage the lip 42 of the container 20, and the cover protrusions 76 can matingly engage the corresponding recesses 74 and protrusions 76 can engage each other, to complete the assembly of the device 10. When fully assembled, the device 10 can provide a system for heating or cooling a potable liquid without diluting the liquid and without contaminating the liquid with the insulating material.

If the mating recesses-protrusions 74, 76 are not engaged, the cover 24 can rotate around the lip 42 of the container 20. When the mating recesses-protrusions 74, 76 are engaged, the cover 24 can be locked in a configuration such that the cover 24 cannot slide out of place, and the open portion of cover 24 can be positioned proximate to the container handle member 45.

In some embodiments, the cover 24 snaps firmly into place from the top down with the container 20. Thereafter, the cover 24 cannot be disengaged from the container 20 via the same direction that the cover 24 was snapped on. To disengage the cover 24 according to some embodiments, a user would rest his or her palm on the handle member 45, and extends their fingers to pull the fluid reservoir 56 directly back toward the handle member 45, thereby disengaging the cover 24 from the container 20. This maneuver ensures that the user is at no risk of the cover 24 disengaging when the device 10 is used with hot liquids, but the device 10 can be intentionally disassembled for cleaning. It is understood that other methods of securely engaging and disengaging the cover 24 with the container 20 may also be used, and such other methods are also within the scope and spirit of this disclosure.

The upper end portion 66 of the coil 64 can be engaged to the intake 62, preferably in a liquid-tight connection. The cover 24 can be manipulated to engage the container 20. For example, each corresponding recess 74 and protrusion 76 can be positioned to matingly engage each other, thus guiding the cover 24 and container 20 into an assembled configuration.

An alternative way to provide insulating material into the inner chamber 46, such as when the cover 24 and the container 20 are engaged, is by adding the insulating material via the passageway provided by the open portion 54 of the cover 24.

Liquid can be poured or introduced into the fluid reservoir 56 to enter the coil or conduit 64 via the intake 62, pass through the coil 64, and out the outlet 28. As the liquid passes through the coil 64, which is immersed in or in close proximity to an insulating material, the liquid temperature can be altered.

Water can be poured in over the ice to a level sufficient to cover the majority of the central portion 70 of the coil 64. The liquid to be cooled, such as some fine Kentucky Bourbon, is then poured slowly into the fluid reservoir 56 and allowed to flow by gravity into the coil 64. A cup or pitcher or other receptacle can then be placed or held under the outlet 28. After a short time interval, which depending on the type and amount of liquid can be on the order of 20 seconds to a few minutes, the liquid can be drawn from the appliance by opening the outlet 28. Under normal operating conditions, the liquid will be chilled well below room or ambient temperature. In the event, however, that further chilling should be desired, the liquid can be run through the appliance again in the manner described above.

Thus, a liquid that has a first temperature when it enters the device 10, can pass through the chilled coil 64 or conduit, such that when the liquid circulates through the device 10, the liquid passes from the first temperature to a second temperature lower than the first temperature, and the liquid possesses the cooler, lower second temperature when it exits the device 10.

During this process, additional insulating material, such as additional ice or water, can be introduced through the opening provided by the open section 54 of the cover 24, without necessitating the disconnection of the coil 64 from the device 10. As needed, excess insulating material can be removed from the container 20 by siphoning or pouring excess insulating material through the open section 54 of the cover 24 and out of the device 10.

In other embodiments, where it is desired to heat a liquid, rather than chill it, a warm, hot, or boiling liquid or substance, such as heated water, can be used in place of ice or cold water. Here, a liquid that has a first temperature when it enters the device 10, can pass through the heated coil 64 or conduit, such that when the liquid circulates through the device 10, the liquid passes from the first temperature to a second temperature greater than the first temperature, and the liquid possesses the hotter, elevated second temperature when it exits the device 10.

Although the device 10 is primarily intended for altering the temperature of potable liquids, it can also be used to alter the temperature of other liquids for other applications, including body paints, cosmetics, and medicines, and the like.

In some embodiments, the container 20, cover 24, and coil 64 can be disassembled from each other, for cleaning the components of the device 10 and for storage.

Specific embodiments of a portable device 10 for quickly changing the temperature of a liquid or fluid according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. It is understood to encompass the present invention and any and all modifications, variations, or equivalents that fall within the spirit and scope of the basic underlying principles disclosed and claimed herein.

What is claimed is:

1. A portable device for chilling and heating a fluid, the device comprising:
   a container for receiving an insulating material having:
   a fluid-tight lower floor section having an outlet;
   a non-fluid-tight upper section; and
   a sidewall there between;
   a cover defining a closure for the upper section of the container, the cover having an open section and a solid section;
   a fluid reservoir in the solid section of the cover, the fluid reservoir for receiving a fluid, the entire fluid reservoir is positioned below a horizontal plane defined by a highest point of the open section, and the fluid reservoir including an intake;
   a coil of temperature-conductive tubing having:
   an upper end portion for communicating with the intake; and
   a lower end portion for communicating with the outlet;
   the coil being housed within a lower section of the container in spaced relation with the sidewall;
   wherein when the insulating material is placed in the container, and when the fluid circulates through the coil, the fluid passes from a first temperature to a second temperature different than the first temperature.

2. The device of claim 1:
the fluid reservoir including a peripheral wall for communicating with a portion of the upper section of the container, the peripheral wall including one or more protrusions; and
the upper section of the container including one or more corresponding recesses;
wherein, when the cover engages the container, the one or more protrusions can matingly engage the one or more corresponding recesses.

3. The device of claim 2, comprising a handle;
wherein, when the one or more protrusions matingly engage the one or more corresponding recesses, the open section of the cover is located proximate to the handle.

4. The device of claim 1:
the intake comprising a channel for engaging the coil; and
the outlet comprising a channel for engaging the coil.

5. The device of claim 1, the upper and lower end portions of the coil each including a gasket for engaging the intake and the outlet, respectively.

6. The device of claim 1, the fluid reservoir defining a depression, the intake positioned in a central portion of the depression.

7. The device of claim 6, wherein the temperature-conductive tubing is made of a metal or a metal alloy.

8. The device of claim 6, wherein the insulating material is ice.

9. The device of claim 6, wherein the open section provides a passageway for the addition of the insulating material after the cover engages the container.

10. The device of claim 3, wherein the cover is configured to disengage the container when an external force is applied on the fluid reservoir toward the handle.

11. A liquid cooling and dispensing device, the device comprising:
an enclosure defining an inner chamber, the enclosure comprising:
a lower portion having a floor, the floor including a first opening; and
an upper portion having a mouth;
a closure for covering the mouth, the closure including a liquid reservoir and an opening section, the liquid reservoir having a second opening; and
a conduit extending inside the inner chamber and providing a passage for transporting a liquid between the first opening and the second opening;
wherein a insulating material can be placed inside the inner chamber and in contact with the conduit, such that when the liquid circulates through the device, the liquid passes from a first temperature to a second temperature lower than the first temperature,
wherein the entire liquid reservoir is positioned below a horizontal plane defined by a highest point of the opening section, and the liquid can be poured into the liquid reservoir to enter the conduit via the second opening,
wherein the opening section allows for the addition of the insulating material after the closure engages the enclosure.

12. The device of claim 11:
the liquid reservoir including a peripheral wall for communicating with a portion of the upper portion of the enclosure, the peripheral wall including one or more protrusions; and
the upper portion of the enclosure including one or more corresponding recesses;
wherein, when the closure engages the enclosure, the one or more protrusions can engage the one or more corresponding recesses.

13. The device of claim 12, comprising a handle;
wherein, when the one or more protrusions engage the one or more corresponding recesses, the open section of the closure is located proximate to the handle.

14. The device of claim 11:
the first opening comprising a channel for engaging the conduit; and
the second opening comprising a channel for engaging the conduit.

15. The device of claim 11, wherein the conduit is made of a metal or a metal alloy.

16. The device of claim 11, wherein the insulating material is ice.

17. The device of claim 16, wherein the opening section provides a passageway for the addition of the insulating material after the closure engages the enclosure.

18. The device of claim 12, wherein the closure is configured to disengage the enclosure when an external force is applied on the liquid reservoir toward the handle.

* * * * *